(12) United States Patent
Namuduri (10) Patent No.: US 7,303,056 B2
(45) Date of Patent: Dec. 4, 2007

(54) MAGNETORHEOLOGICAL DEVICE AND SYSTEM AND METHOD FOR USING THE SAME

(75) Inventor: Chandra S. Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 168 days.

(21) Appl. No.: 11/008,419

(22) Filed: Dec. 9, 2004

(65) Prior Publication Data

US 2006/0124413 A1    Jun. 15, 2006

(51) Int. Cl.
*F16F 9/53*    (2006.01)

(52) U.S. Cl. .................... 188/267.2; 188/290

(58) Field of Classification Search ............. 188/267.2, 188/267, 266.3, 290
See application file for complete search history.

(56) References Cited

U.S. PATENT DOCUMENTS

| | | | |
|---|---|---|---|
| 4,815,575 A | 3/1989 | Murty | 188/299 |
| 5,630,623 A | 5/1997 | Ganzel | 280/772 |
| 5,878,997 A * | 3/1999 | Miesner | 267/140.14 |
| 6,279,701 B1 | 8/2001 | Namuduri et al. | 188/267.2 |
| 6,390,252 B1 | 5/2002 | Namuduri et al. | 188/267.2 |
| 6,471,018 B1 * | 10/2002 | Gordaninejad et al. | 188/267.1 |
| 6,641,166 B2 * | 11/2003 | Browne et al. | 280/752 |
| 6,662,912 B2 * | 12/2003 | Smith et al. | 188/267.1 |
| 6,883,649 B2 * | 4/2005 | Lun | 188/267.2 |
| 2003/0062214 A1 * | 4/2003 | Smith et al. | 180/443 |
| 2005/0121269 A1 * | 6/2005 | Namuduri | 188/267.1 |

FOREIGN PATENT DOCUMENTS

| | | | |
|---|---|---|---|
| JP | 63009739 A | * | 1/1988 |
| JP | 01216138 A | * | 8/1989 |
| JP | 09264492 A | * | 10/1997 |
| KR | 2003004147 A | * | 1/2003 |

* cited by examiner

*Primary Examiner*—Xuan Lan Nguyen (57) ABSTRACT

A controllable magnetorheological (MR) damper having first, second and third portions is disclosed. The first and second portions have a translational degree of freedom therebetween, and the third portion has a rotational degree of freedom with respect to the first and second portions. The first and third portions are coupled via a translation-to-rotation converter, and the second and third portions are coupled via a magnetorheological (MR) fluid. A bearing is disposed between the first and second portions for supporting a side load therebetween, a magnetic field generator is in field communication with the magnetorheological fluid, and a signal path is in signal communication with the magnetic field generator. The third portion is rotationally responsive to translational motion between the first and second portions, the shear stress characteristic of the magnetorheological fluid is responsive to the magnetic field generator, and the magnetic field generator is controllably responsive to an excitation signal from the signal path.

16 Claims, 7 Drawing Sheets

MAGNETORHEOLOGICAL DEVICE AND SYSTEM AND METHOD FOR USING THE SAME

BACKGROUND OF THE INVENTION

The present disclosure relates generally to a magnetorheological damper, and particularly to a controllable magnetorheological damper for damping the suspension system of a vehicle, and a control system and method for using the same.

Vehicle suspension systems utilize damping devices or shock absorbers for controlling the vibrations of the body and wheel due to road disturbances imposed on the mass-spring system of the vehicle body, wheel and suspension springs. A vehicle suspension damper usually provides a resistive force proportional to the relative velocity between the body and the wheel. Passive dampers may employ an oil-filled cylinder and piston arrangement, while active and controllable dampers may employ a magnetorheological (MR) fluid-filled cylinder and piston arrangement where the viscosity of the MR fluid may be changed by the introduction of a magnetic field. Such MR dampers, however, employ large quantities of MR fluid, such as in excess of one liter per vehicle, need special finishes on the piston rod and the inner surface of the cylinder wall, and need special seals to minimize abrasion from the MR fluid. Passive and active dampers may be used in struts at the front of a vehicle and/or as shock absorbers at the rear of the vehicle.

While existing dampers, suspension damping systems and methods for controlling suspension damping systems may be suitable for their intended purpose, there remains a need in the art for improvements that overcome existing drawbacks.

BRIEF DESCRIPTION OF THE INVENTION

Embodiments of the invention include a controllable magnetorheological (MR) damper having first, second and third portions. The first and second portions have a translational degree of freedom therebetween, and the third portion has a rotational degree of freedom with respect to the first and second portions. The first and third portions are coupled via a translation-to-rotation converter, and the second and third portions are coupled via a magnetorheological (MR) fluid. A bearing is disposed between the first and second portions for supporting a side load therebetween, a magnetic field generator is in field communication with the magnetorheological fluid, and a signal path is in signal communication with the magnetic field generator. The third portion is rotationally responsive to translational motion between the first and second portions, the shear stress characteristic of the magnetorheological fluid is responsive to the magnetic field generator, and the magnetic field generator is controllably responsive to an excitation signal from the signal path.

Other embodiments of the invention include a suspension damping system for a vehicle having a body and a wheel. A magnetorheological (MR) strut is connected to a suspension spring and the body of the vehicle at one end, and to a support of the vehicle wheel at an opposite end. An electronic control system is responsive to a vehicle operating characteristic and is in signal communication with the MR strut. The MR strut is responsive to a control signal from the electronic control system for changing the damping characteristic of the MR strut.

Further embodiments of the invention include a method of controlling a vehicle suspension damping system. Signals from a plurality of sensors are received at a controller. The signals are analyzed, and an activation signal is generated in response thereto. In response to the activation signal, a magnetorheological (MR) damper is activated so as to cause an increase in the shear strength of a MR fluid at the MR damper, an opposing torque action at a magnetic rotor of the MR damper, an opposing translation-to-rotation conversion action at a translation-to-rotation converter of the MR damper, and increased damping of translational motion between a first and a second portion of the MR damper absent complete restraint of the first portion with respect to the second portion.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention utilizes controllable magnetorheological (MR) dampers in struts in the suspension system of a vehicle, thereby providing continuously controllable damping characteristics to the vehicle. Embodiments of the invention may use MR dampers in the front struts only, as replacements for the rear shock absorbers only, or for both purposes. In an embodiment, an electronic control module (controller) is used with suspension relative displacement sensors (one per wheel corner), and may also be used with a vehicle lateral accelerometer, a steering angle sensor and a vehicle speed sensor, for providing an excitation signal to the MR damper to allow for continuous modification of the damping characteristics of the vehicle suspension system. In response to the vehicle speed, steering angle and lateral acceleration, the control module may send a range of activation signals to the MR dampers resulting in a range of vehicle suspension damping characteristics. Additionally, a driver-actuated switch may work in conjunction with the controller for providing a high or low gain factor to the excitation signal depending on whether the driver prefers a stiffer ride or a smoother ride.

Figure 1:
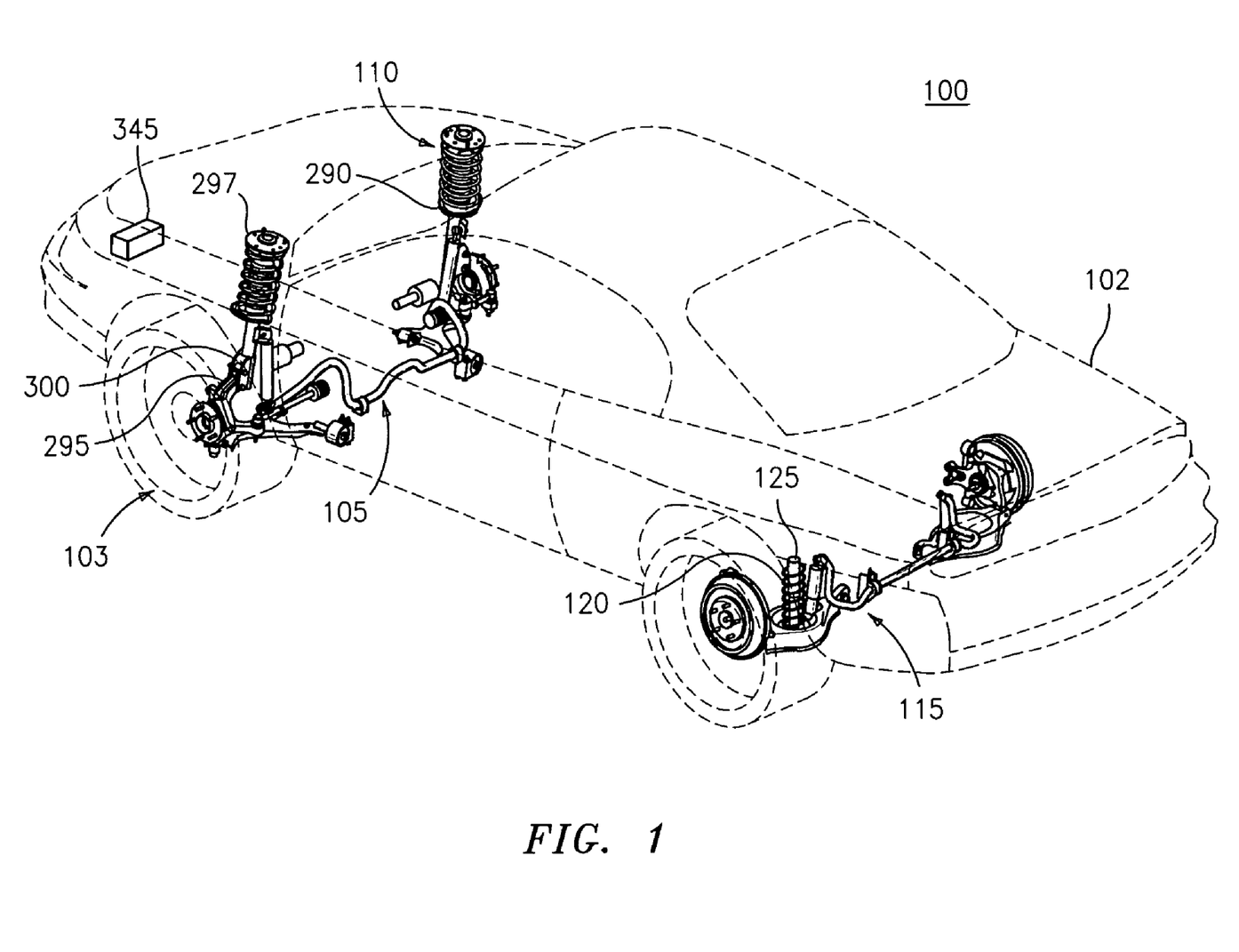
FIG. 1 depicts an exemplary vehicle for implementing embodiments of the invention.
Figure 2:
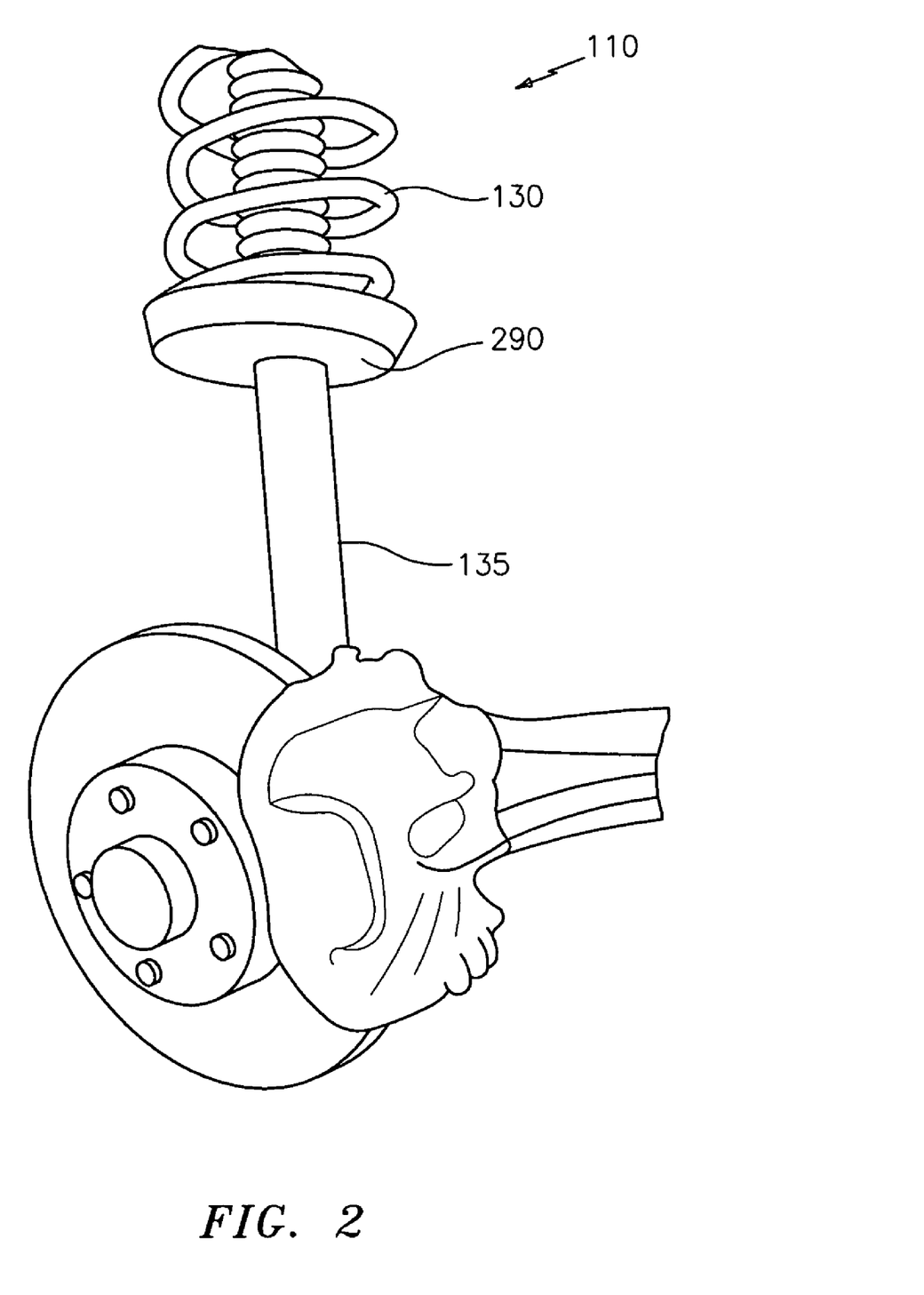
FIG. 2 depicts an isometric view of a portion of FIG. 1 for implementing embodiments of the invention.
Figure 3:
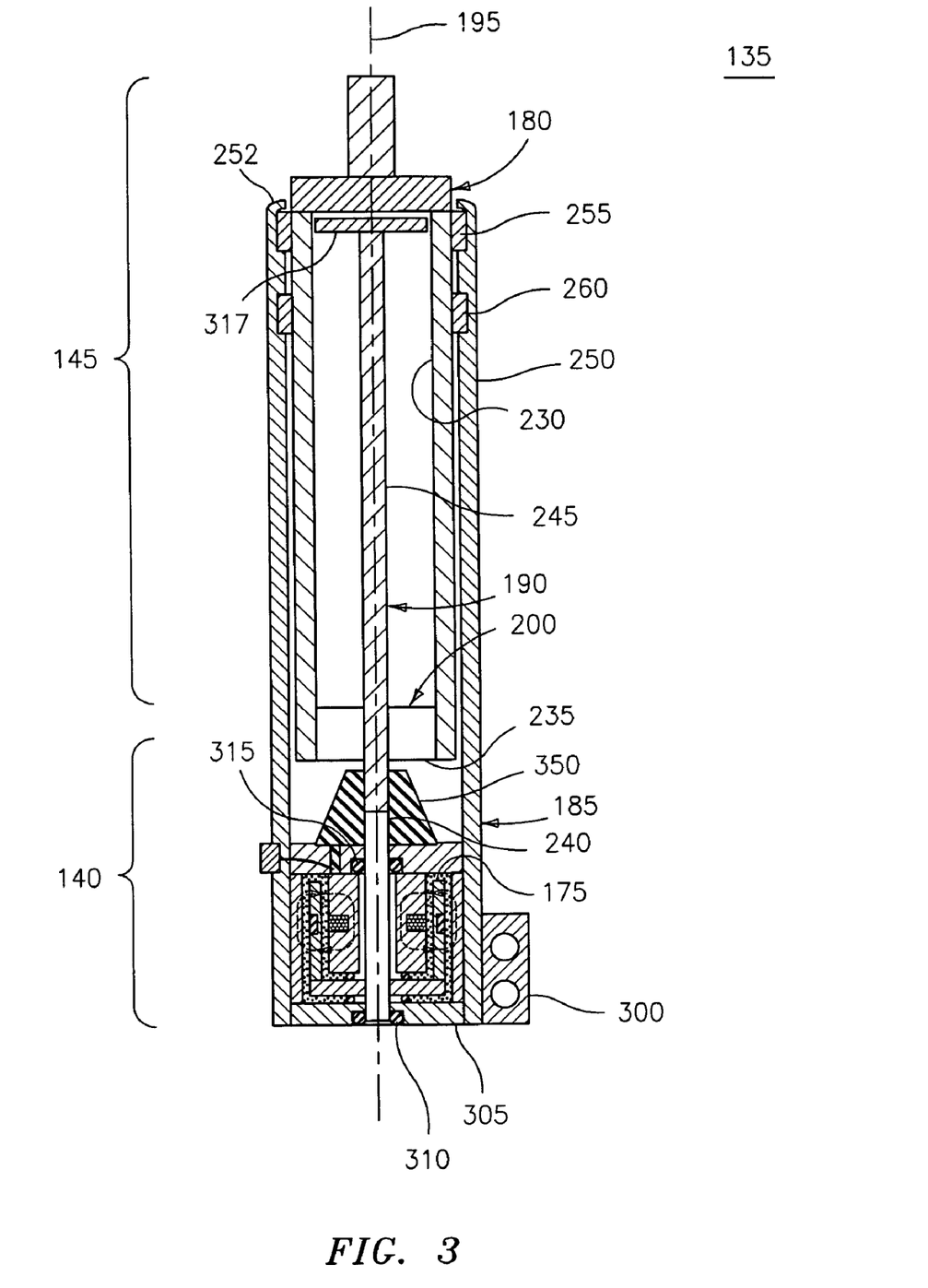
FIG. 3 depicts a block diagram representation of magnetorheological (MR) damper in accordance with embodiments of the invention.

FIG. 1 is an exemplary embodiment of a vehicle 100 having a body 102, a set of wheels 103, a front suspension system 105 with a front strut 110, and a rear suspension system 115 having a rear spring 120 and rear shock absorber 125. Front strut 110, best seen by now referring to FIG. 2, includes a front spring 130 and a front shock absorber 135. In accordance with embodiments of the invention, shock absorbers 125 and 135 may separately be or may both be magnetorheological fluid (MR) dampers, such as that depicted in FIG. 3. While FIG. 3 depicts shock absorber 135 as a MR damper, it will be appreciated that the same figure may also relate to shock absorber 125. Accordingly, and as used herein, numeral 135 refers to a MR damper that may be utilized as a front shock absorber 135 or a rear shock absorber 125.

Embodiments of the invention may use any one of several different types of MR dampers 135 depending on the packaging space. An exemplary MR damper 135 is a damper that utilizes a minimum amount of MR fluid and achieves the desired damping characteristics in response to a variable excitation signal. In an embodiment, the amount of MR fluid used is equal to or less than about 50 cc (cubic centimeters), and preferably equal to or less than about 10 cc, compared with more than 100 cc used in other MR damper type devices. However, it is also within the scope of this invention to use linearly translating MR dampers that use greater than about 50 cc of MR fluid.

Figure 4:
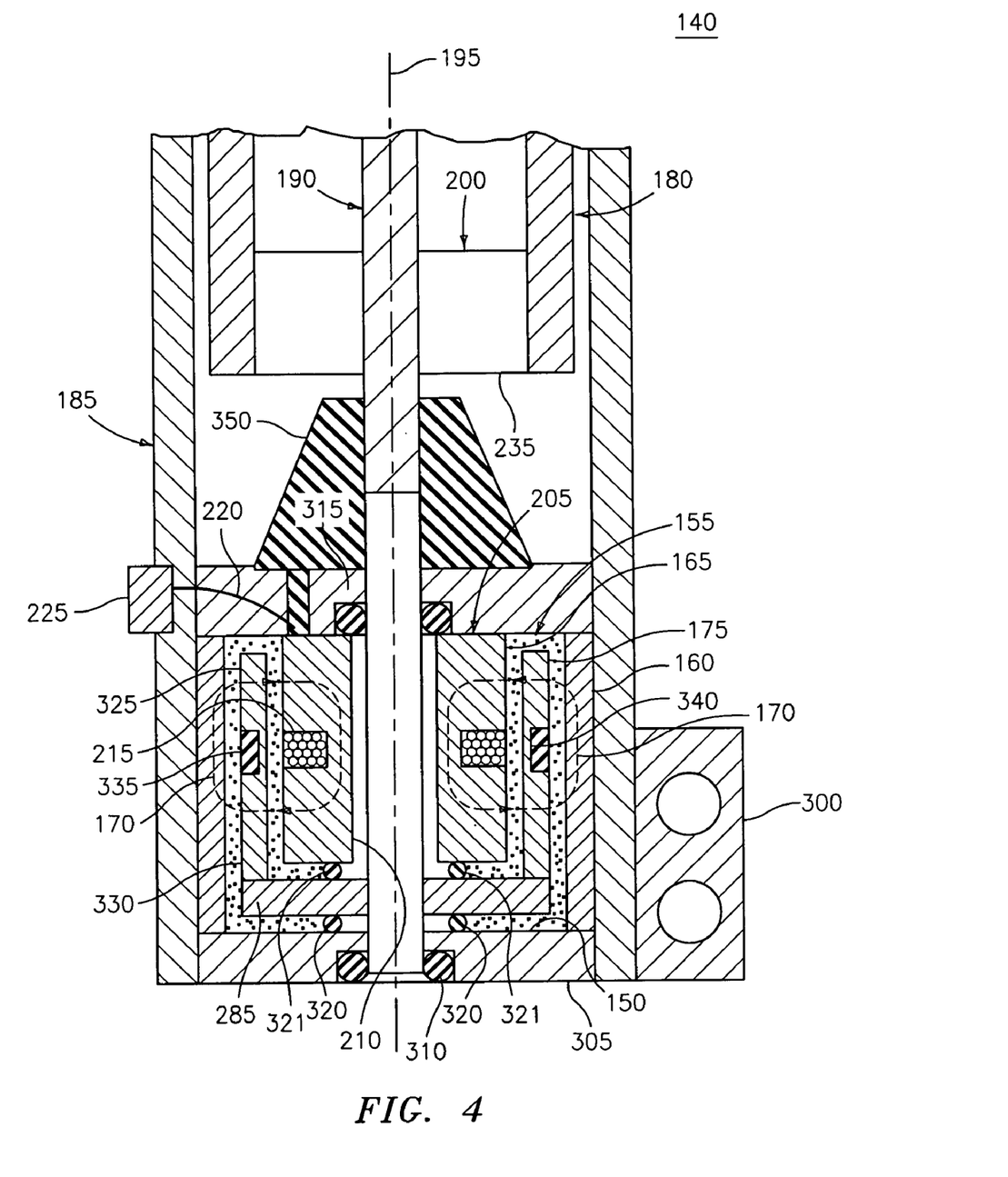
FIG. 4 depicts an expanded lower portion of the MR damper of FIG. 3.
Figure 5:
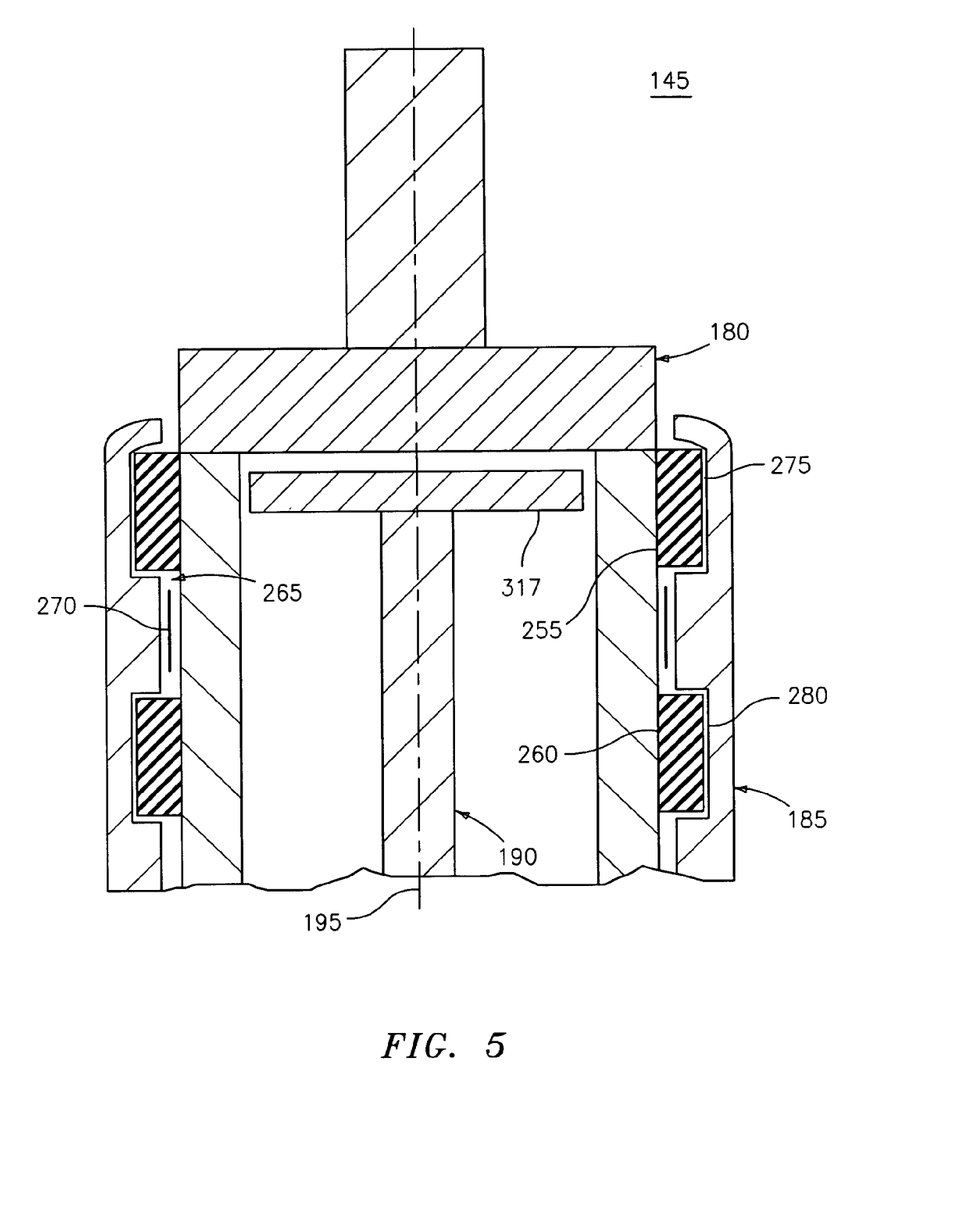
FIG. 5 depicts an expanded upper portion of the MR damper of FIG. 3.

Reference is now made to FIGS. 3-5, which depict a cross-section block representation of a complete MR damper 135 (FIG. 3), an expanded lower portion 140 of MR damper 135 (FIG. 4), and an expanded upper portion 145 of MR damper 135 (FIG. 5). In general, MR damper 135 utilizes a magnetorheological fluid 150 dispensed in an annular space 155 between two concentric cylinders 160, 165 made of magnetic material where it is subjected to a controllable magnetic field 170. Cylinder 160 is also herein referred to as a stator 160, and cylinder 165 is also herein referred to as a core 165. Within annular space 155 is disposed a magnetic cylindrical rotor 175, which is surrounded by the MR fluid 150. Under zero magnetic field, the MR fluid 150 may be easily sheared to produce little resistance to rotation of rotor 175, whereas under a continuously variable magnetic field 170, the MR fluid 150 exhibits a yield stress that increases as a function of magnetic field strength, thereby resisting rotation and generating a significant variable opposing torque on rotor 175 within MR fluid 150 of MR damper 135. In an embodiment, annular space 155 is sized to hold equal to or less than about 50 cc of MR fluid 150, and in another embodiment is sized to hold equal to or less than about 10 cc of MR fluid 150.

MR damper 135 includes first 180, second 185 and third 190 portions. First and second portions 180, 185 are disposed having a translational degree of freedom parallel to axis 195 and with respect to each other, and third portion 190 is disposed having a rotational degree of freedom about axis 195 and with respect to the first and second portions 180, 185. First and third portions 180, 190 are coupled via a translation-to-rotation converter 200, and second and third portions 185, 190 are coupled via MR fluid 150 within annular space 155. A magnetic field generator 205 at lower portion 140 is in field communication with the MR fluid 150 within the annular space 155, and includes a core 210 and a coil 215. A signal path provided by leads 220 and connector 225 enables excitation signals to be received at coil 215 for producing magnetic field 170. Third portion 190 is rotationally responsive to translational motion between the first and second portions 180, 185, and the shear stress characteristic of the MR fluid 150 within annular space 155 is responsive to magnetic field generator 205, such that a rotational damping action of third portion 190 results from field excitation at magnetic field generator 205.

In an embodiment, first portion 180 includes a cylindrical tube 230 having a ball nut 235, third portion 190 includes a shaft 240 having a ball screw 245 at one end and the magnetic rotor 175 at an opposing end, and second portion 185 includes a cylindrical, metallic (such as magnetic steel, non-magnetic steel, aluminum, or magnesium, for example) housing 250 receptive of the first portion 180, the third portion 190, and the magnetic field generator 205. Ball screw 245 is engagingly disposed at ball nut 235 for providing rotational motion therebetween, and magnetic rotor 175 is disposed within the MR fluid 150 at annular space 155 that provides fluid communication therebetween.

Disposed between first 180 and second 185 portions, where in an embodiment each have cylindrical cross sections, are ring bearings 255, 260 for supporting a side load between first and second portions 180, 185. Ring bearings 255, 260 are axially displaced with respect to each other to define an interspatial region 265 that may contain a lubricant 270 for reducing sliding friction between first and second portions 180, 185. In an embodiment, the cylindrical wall of second portion 185 has an interior surface that includes circumferential recesses, or channels, 275 and 280 for securely receiving and fixing ring bearings 255, 260. Ring bearings 255, 260 may be ball bearings in a bearing race, lubricious bearing material such as bronze for example, or any other bearing device or material suitable for the purposes disclosed herein. The bearings 255, 260 may also be secured in place by crimping the portions of the tube 250 immediately adjacent to both sides of each bearing, as depicted generally by crimp 252 in FIG. 5. While only one crimp 252 is depicted in FIG. 5, it will be appreciated that crimp 252 may be applied to tube 250 at both sides of each bearing 255, 260, thereby securing bearings 255, 260 in place.

In an embodiment, first, second and third portions 180, 185, 190 form a linear-to-rotary conversion device made up of ball screw 245 and ball nut 235, where ball nut 235 is attached to the lower end of cylindrical tube 230, and ball screw 245 is attached to the cylindrical magnetic rotor 175 through a non-magnetic support disc 285. The upper end of second portion 185 is attached to a spring cup 290 for retaining the lower end of front suspension spring 130, best seen by referring to FIG. 2, the lower end of second portion 185 is attached to wheel support 295 via bracket 300, best seen by referring to FIGS. 1, 3, 4 and 6, and the upper end of first portion 180 is connected to the vehicle body 102 via support plates 297, best seen by referring to FIGS. 1 and 6. Ball screw 245 is secured to rotate within a metallic housing 250 and non-magnetic housing end cover 305 by means of a sealed bushing 310 and a sealed thrust ball bearing 315 at one end, and by means of a ball screw end support 317 at the other end. Ball screw end support 317 serves to maintain the axial relationship of ball screw 245 with respect to the tube 230 of first portion 180. As ball nut 235 travels up and down with tube 230 due to vehicle body movements, ball screw 245 rotates in one direction or the other, along with magnetic rotor 175 and attached support disc 285. A jounce bumper 350 made of an elastomeric material is disposed between first and second portions 180, 185 for absorbing impact forces acting therebetween. Magnetic rotor 175 is disposed between the soft magnetic cylindrical stator 160 and the soft magnetic cylindrical core 165, which are captivated within cylindrical housing 250. Core 165 and encapsulated magnetic coil 215 together make up the magnetic field generator 205. The annular space 155 formed between the cylindrical surface of stator 160 and the cylindrical surface of core 165 is filled with the MR fluid 150 that is prevented from leaking out of MR damper 135 by dynamic O-ring seals 320, 321, which dynamically interface with the rotational motion of third portion 190. In the embodiment of FIG. 4, two dynamic O-ring seals 320, 321 are used, while in an alternative embodiment depicted in FIG. 7, only a single dynamic O-ring seal 322 is used, which aids to further reduce friction and component wear. In the alternative embodiment of FIG. 7, static O-rings 323 may be used provide additional sealing for MR fluid 150.

In an embodiment, and referring now back to FIG. 4, cylindrical rotor 175 has three cylindrical sections 325, 330 and 335, with first and second sections 325, 330 being made of magnetic material, as discussed previously, and third section 335 being made of substantially non-magnetic material. Third section 335 is radially disposed with respect to coil 215, thereby providing the desired flux path for magnetic field 170 through the aforementioned magnetic material. Third section 335 may be made up of substantially non-magnetic material such as stainless steel, aluminum, brass, for example, or may have a rib 340 of magnetic material having such a thickness that it prevents a significant amount of magnetic flux from being diverted away from the portion of annular space 155 closest to stator 160.

In response to an electrical current being passed through coil 215 from an external source such as the vehicle battery 345 (depicted in FIGS. 1 and 6) via connector 225 and leads 220, a magnetic field 170 is produced in the radial direction with respect to axis 195 across annular space 155 between core 165, rotor 175 and stator 160. The strength of the magnetic field or flux density within MR fluid 150 determines the shear stress characteristics of MR fluid 150, thereby controlling the degree of torque that acts to resist the rotation of magnetic rotor 175. The resulting magnetic flux lines 170 that traverse annular space 155 are depicted in FIGS. 3 and 4.

The resisting torque acting on magnetic rotor 175 translates to a force that resists the linear movement of ball nut 235 and attached cylindrical tube 230. By the appropriate selection of: the pitch of ball screw 245; the axial and radial dimensions of stator 160, core 165, and rotor 175; the number of turns of coil 215; the range of currents through coil 215; and an MR fluid 150 with a suitable concentration of iron particles, forces sufficient to dampen the translational movement between first and second portions 180, 185, and thus axial movement of strut 110, may be generated by controlled activation of MR damper 135. Similarly, the above noted parameters may be chosen in such a way as to achieve minimum force generation when the current through coil 215 is set to zero, thereby resulting in a de-coupled operation of strut 110.

Figure 6:
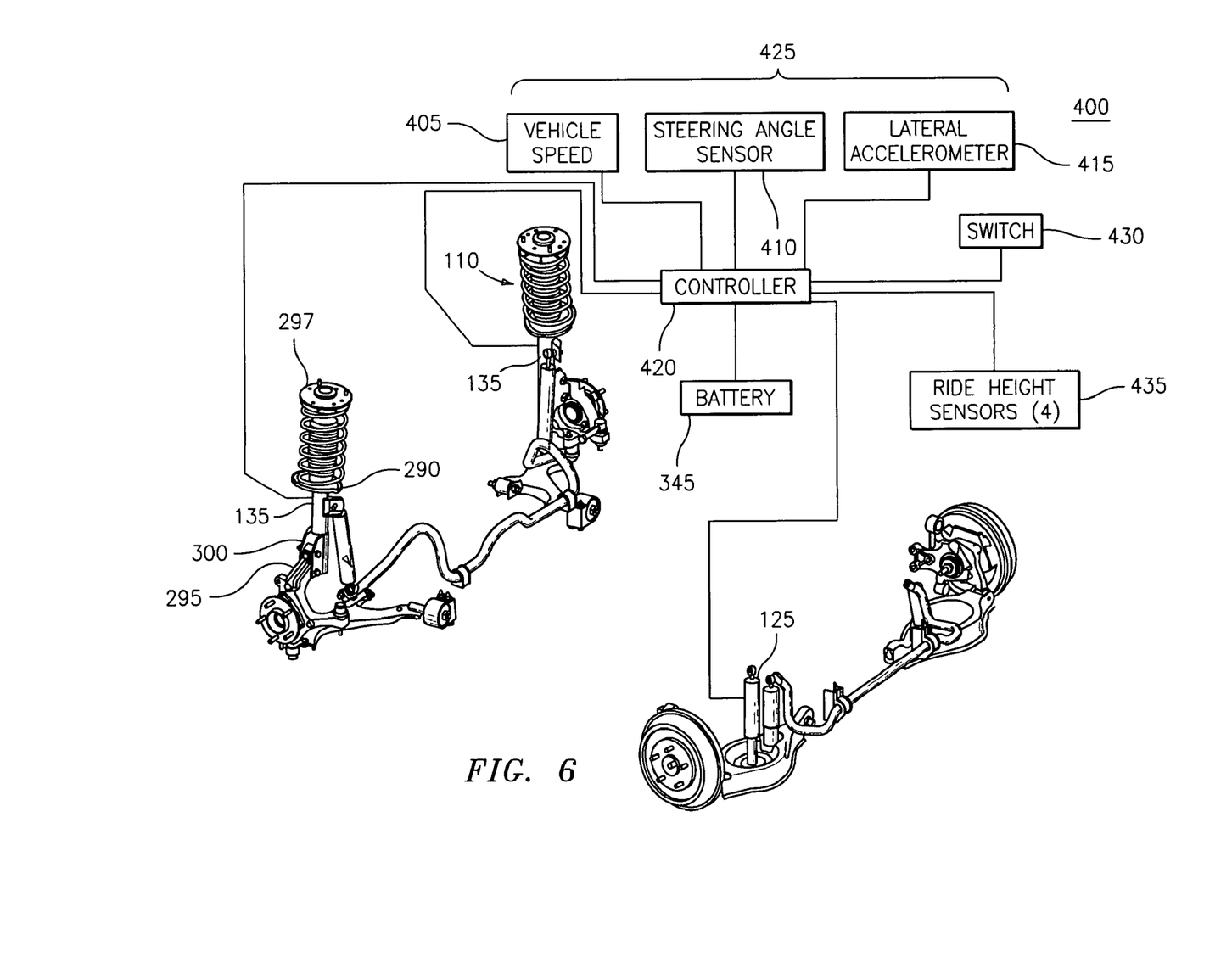
FIG. 6 depicts a suspension damping system in accordance with embodiments of the invention.
Figure 7:
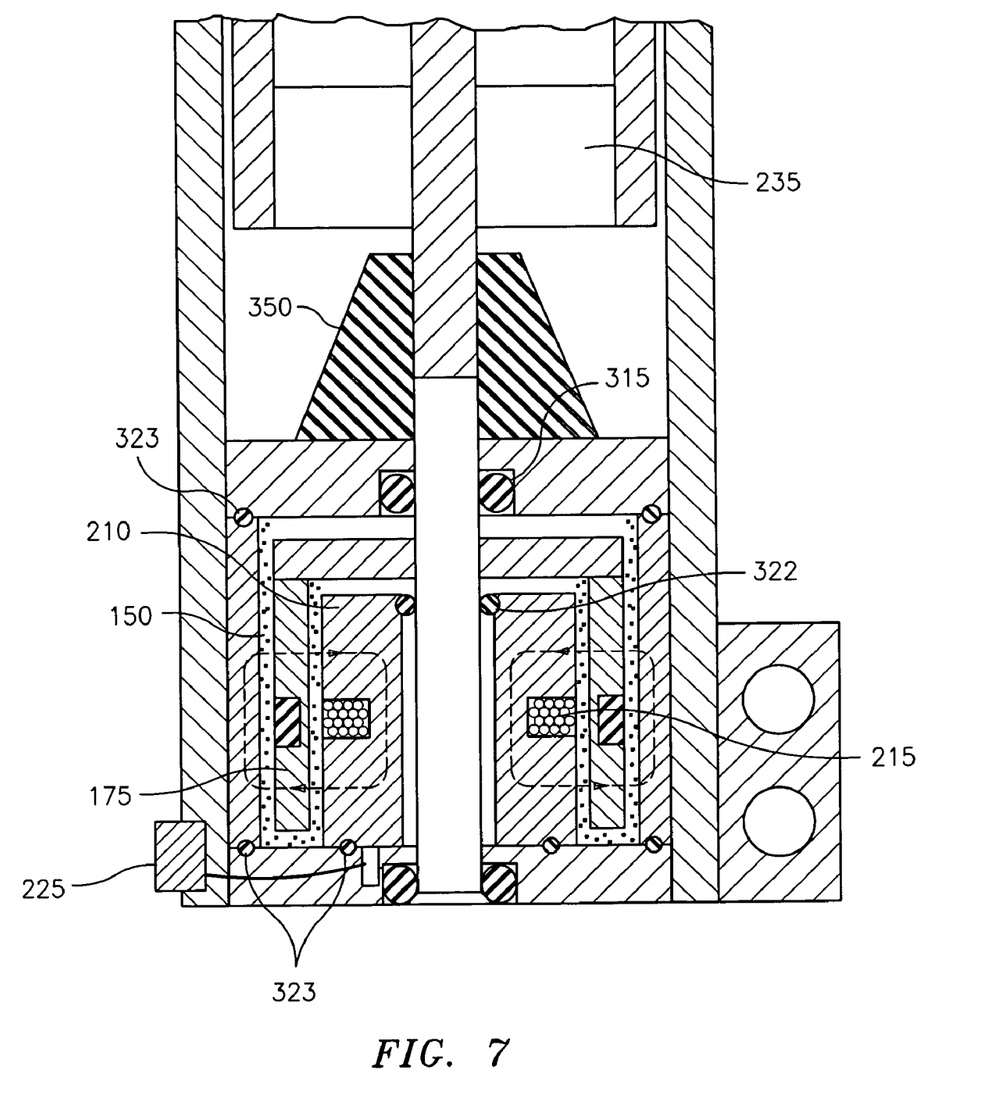
FIG. 7 depicts an alternative embodiment to that depicted in FIG. 4.

The utilization of MR damper 135 in a suspension damping system 400 will now be described with reference to FIG. 6. In an embodiment, suspension damping system 400 includes a plurality of sensors 405, 410, 415, 435, a controller 420, and at least one MR damper 135. Sensors 405, 410, 415, 435 and controller 420 may also be herein referred to as an electronic control system 425. In an embodiment, the plurality of sensors includes a vehicle speed sensor 405, a steering angle sensor 410, four suspension relative-displacement sensors 435 (one per wheel corner for example), and/or a lateral accelerometer 415, which are responsive to the respective operating characteristic of vehicle 100. Controller 420 is responsive to signals from the plurality of sensors 405, 410, 415, 435 for generating an activation signal that causes an increase in the shear strength of the MR fluid 150, an opposing torque action at rotor 175, and an opposing translation-to-rotation conversion action at converter 200, thereby changing the damping characteristics of strut 110 on demand. While FIG. 6 depicts two front shock absorbers 135, but only one rear shock absorber 125, it will be appreciated that this is for illustration purposes only, and that vehicle 100 may include a second rear shock absorber, not shown, that also functions in accordance with embodiments of the invention.

Depending on the driving conditions of vehicle 100, such as fast cornering, stable cruising, or a transition from one to the other, sensors 405, 410, 415, 435 provide controller 420 with input signals that enable controller 420 to provide a continuous stream of control signals to MR damper 135, thereby enabling MR damper 135 to be continually responsive to dynamic driving conditions. In an alternative embodiment, vehicle 100 is equipped with a driver-actuated switch 430 that works in conjunction with controller 420 for providing a high or low gain factor to the excitation signal sent to coil 215 depending on whether the driver prefers a stiffer ride or a smoother ride. Whether switch 430 is in a stiff ride position or a smooth ride position, controller 420 is capable of providing a continuous stream of signals to MR damper 135 for continually adjusting the damping characteristics of strut 110.

In view of the foregoing, embodiments of the invention may perform a method of controlling a vehicle suspension damping system 400 by, receiving at controller 420 signals from sensors 405, 410, 415, 435, analyzing the signals and generating an activation signal in response thereto, and activating MR damper 135 in response to the activation signal so as to cause an increase in the shear strength of MR fluid 175, an opposing torque action at magnetic rotor 175, an opposing translation-to-rotation conversion action at converter 200, and increased damping of translational motion between first and second portions 180, 185 of strut 110 absent the complete restraint of first portion 180 with respect to second portion 185.

As disclosed, some embodiments of the invention may include some of the following advantages: a low cost automotive suspension damping system with side load withstand capability absent the requirement of a hydraulic pump or hydraulic power; lower system cost as a result of small MR fluid usage; lower system cost due to the elimination of gas springs, high-pressure seals and special rod and tube finishes required to minimize abrasion in a telescopic MR damper-type shock absorber device; lower cost by eliminating the need to have a gas reservoir to accommodate fluid displacement by rod volume; improved ride comfort and quality; reduced head toss during a vehicle maneuver; utilization of an MR damper that has a fast response time on the order of 10 milliseconds; reduced package size due to the elimination of accumulator and hydraulic lines; the ability to be utilized for controlling vehicle stability in vehicle oversteering conditions; improved vehicle ride quality during straight driving; and, minimal parasitic power consumption due to the absence of high electrical or hydraulic power demand under normal driving operation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A controllable magnetorheological (MR) damper, comprising:
   first, second and third portions;
   the first and second portions having a translational degree of freedom therebetween;
   means for supporting a side load while permitting a sliding action between the first and second portions;
   the third portion having a rotational degree of freedom with respect to the first and second portions;
   the first and third portions coupled via a translation-to-rotation converter;
   the second and third portions coupled via a magnetorheological (MR) fluid;
   a magnetic field generator in field communication with the magnetorheological fluid; and
   a signal path in signal communication with the magnetic field generator;
   wherein the third portion is rotationally responsive to translational motion between the first and second portions, the shear stress characteristic of the magnetorheological fluid is responsive to the magnetic field generator, and the magnetic field generator is controllably responsive to an excitation signal from the signal path;
   wherein the third portion comprises a cylindrical rotor ring disposed within the MR fluid;
   wherein the rotor ring comprises two magnetic sections comprising magnetic materials with a substantially non-magnetic section disposed therebetween such that a magnetic flux path is defined by the two magnetic sections about the substantially non-magnetic section.

2. The damper of claim 1, wherein the magnetorheological fluid is responsive to a continuously controllable excitation signal for providing continuously controllable rotational damping of the third portion and translational damping between the first and second portions.

3. The damper of claim 1, wherein:
   the first and second portions each have a cylindrical cross section; and
   the first, second and third portions have a common axis.

4. The damper of claim 3, wherein:
   the first portion comprises a tube having a ball nut;
   the third portion comprises a shaft having a ball screw at one end and a magnetic rotor ring at an opposing end, the ball screw engagingly disposed at the ball nut, the magnetic rotor ring disposed within the magnetorheological fluid; and
   the second portion comprises a housing receptive of the first portion, the third portion, and the magnetic field generator.

5. The damper of claim 1, wherein:
   the magnetic field generator comprises a magnetic core and an excitation coil, the magnetic core defining a first cylindrical surface;
   the second portion comprises magnetic stator defining a second cylindrical surface concentric with the first cylindrical surface, the first and second cylindrical surfaces defining an annular space therebetween, the magnetorheological fluid being disposed within the annular space; and
   the cylindrical rotor ring is disposed within the fluid within the annular space.

6. The damper of claim 5, wherein the substantially non-magnetic section of the rotor ring is radially disposed with respect to the coil.

7. The damper of claim 6, wherein the rotor ring comprises a first cylindrical section, a second cylindrical section, and a rib therebetween, the rib being radially disposed with respect to the coil and defining the substantially non-magnetic section, such that a magnetic field in response to the magnetic field generator traverses a path comprising the core, first and second cylindrical sections, the stator, and the magnetorheological fluid.

8. The damper of claim 5, wherein the annular space is sized to contain equal to or less than about 50 cubic centimeters of the magnetorheological fluid.

9. The damper of claim 8, wherein the annular space is sized to contain equal to or less than about 10 cubic centimeters of the magnetorheological fluid.

10. The damper of claim 1, further comprising:
    a single dynamic O-ring seal disposed in fluid communication with the MR fluid and in rotational communication with the third portion.

11. The damper of claim 1, wherein the means for supporting a side load while permitting a sliding action between the first and second portions comprises a ball bearing.

12. The damper of claim 1, wherein the means for supporting a side load while permitting a sliding action between the first and second portions comprises ball bearings in a bearing race.

13. The damper of claim 1, wherein the means for supporting a side load while permitting a sliding action between the first and second portions comprises a lubricious metallic bearing material.

14. A controllable magnetorheological (MR) damper, comprising:
    first, second and third portions;
    the first and second portions having a translational degree of freedom therebetween;
    means for supporting a side load while permitting a sliding action between the first and second portions;
    the third portion having a rotational degree of freedom with respect to the first and second portions;
    the first and third portions coupled via a translation-to-rotation converter;
    the second and third portions coupled via a magnetorheological (MR) fluid;
    a magnetic field generator in field communication with the magnetorheological fluid; and
    a signal path in signal communication with the magnetic field generator;
    wherein the third portion is rotationally responsive to translational motion between the first and second portions, the shear stress characteristic of the magnetorheological fluid is responsive to the magnetic field generator, and the magnetic field generator is controllably responsive to an excitation signal from the signal path;
    wherein the first and second portions each have a cylindrical cross section and a common axis;
    wherein the first portion is disposed within the second portion;
    wherein the means for supporting a side load comprises a first means for supporting a side load and a second means for supporting a side load axially displaced with respect to each other to define an interspatial region; and further comprising:
    a lubricant disposed within the interspatial region.

15. The damper of claim 14, wherein:
the second portion comprises a cylindrical wall having an interior surface with first and second circumferential recesses; and
the first and second means for supporting a side load are secured within the first and second recesses, respectively.

16. The damper of claim 14, wherein:
the second portion further comprises at least one crimp; and
at least one of the first and second means for supporting a side load are secured by the at least one crimp.

* * * * *